D. SCHEER.
DRAFT EQUALIZER.
APPLICATION FILED JUNE 24, 1909.
947,203.
Patented Jan. 18, 1910.
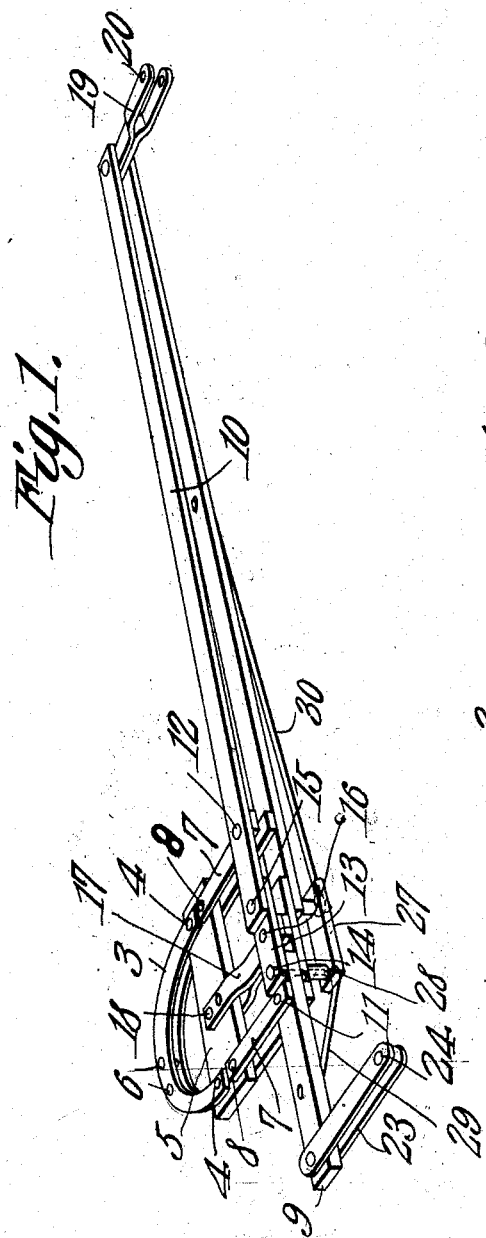
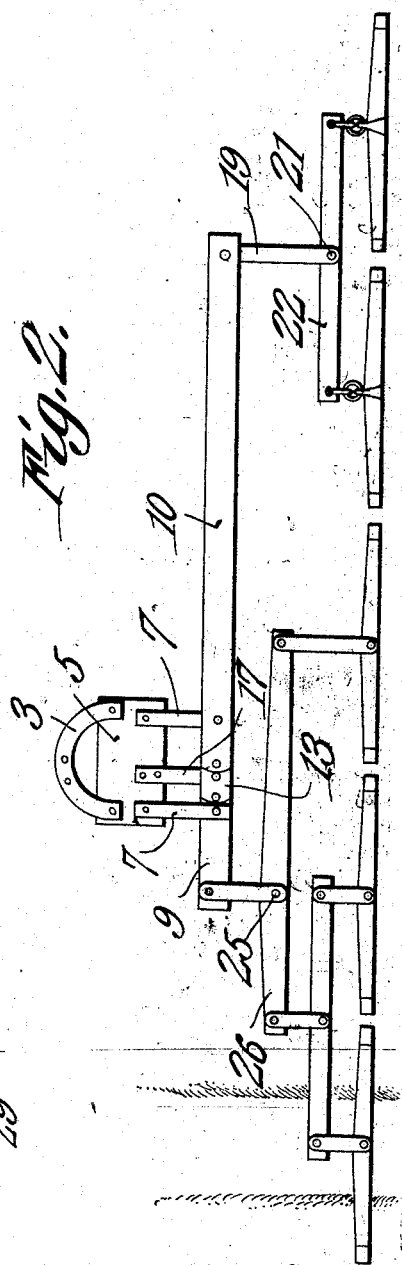
Witnesses
Inventor
Dan Scheer.
By
Attorneys

UNITED STATES PATENT OFFICE.

DAN SCHEER, OF MADISON, NEBRASKA.

DRAFT-EQUALIZER.

947,203.  Specification of Letters Patent.  Patented Jan. 18, 1910.

Application filed June 24, 1909. Serial No. 504,118.

*To all whom it may concern:*

Be it known that I, DAN SCHEER, a citizen of the United States, residing at Madison, in the county of Madison and State of Nebraska, have invented a new and useful Draft-Equalizer, of which the following is a specification.

My invention relates to draft equalizers and has for an object to provide a five horse equalizer adapted for attachment to a gang plow and which, when in operation will not force any of the horses to walk upon the plowed ground.

Another object is to provide a device of this character which will be simple in construction, durable and efficient in operation, and which can be manufactured at a minimum amount of cost.

One of the difficulties experienced in the usual form of equalizer is that there is a tendency for the parts to be strained and warped out of position, thereby necessitating the equalizers to be periodically taken out of commission for repairs. To overcome the above difficulty my invention comprises a long lever and a short lever, connected together adjacent the opposed ends by the yoke which connects the equalizer to the gang plow, the opposed ends of said levers being connected by a short connecting lever upon which the strain of the combined pull of the long and short levers is centered, and which is constructed in such a manner as to meet this strain without any tendency to buckle or work loose from operative position.

With the above and other objects in view, which will appear as the nature of the invention is better understood, my invention embraces the novel features of construction and combination of parts illustrated in the accompanying drawing, described in the following specification, and pointed out in the appended claims.

In the accompanying drawings,—Figure 1 is a perspective view of a five horse draft equalizer constructed in accordance with my invention. Fig. 2 is a plan view of the same showing the device in operative position.

In a more detailed description of my invention in which similar characters of reference designate similar parts in the views shown, the numeral 3 designates the yoke or attaching plate which is preferably made double, that is, of an upper and lower U shaped bar secured together adjacent the forward ends by bolts or similar connectors 4 passing through the bars and through registering openings formed in a cross plate 5 inserted between these bars. The attaching yoke is secured to a gang plow preferably at a point intermediate the ends and for this purpose openings 6 are formed at this point to receive the bolts carried by the attaching member of the plow.

Positioned on the cross plate 5 adjacent the ends of the yoke are extension bars 7, which are secured to the cross plate by bolts or rivets 8. These bars form extensions for the terminals of the attaching yoke, one of the bars being connected at its free end to a short lever 9 and the other to a long lever 10, and constitute fulcrums for said levers as well as rigid terminal extensions for the attaching plate. These extension bars are double, that is, each consists of an upper and lower bar, the upper and lower bars of one of the extensions engaging the short lever in a pivotal connection which, in this instance, is effected by placing the bars one above and one below the short lever, and passing a pivot bolt 11 through the bars and short lever interposed therebetween. The upper and lower bars of the other extension engages the long lever in a similar pivotal joint with the exception that the ends of the bars are interposed between the upper and lower bar of the long lever and secured therebetween by a pivot bolt 12. Thus it is seen that the long and short levers are virtually fulcrumed directly on the extended attaching yoke, the advantages obtained by this construction being to give a rigidity and strength to the device not obtainable in the usual form of evener in which a multiplicity of pivoted levers are interposed between the main levers and the attaching means.

The long lever 10 is double, that is, is composed of an upper bar and a lower bar, held in parallel spaced relation throughout their entire length, the purpose of this construction being to reinforce the lever against buckling. The short lever 9 may be made of a single bar, as shown, as the strain being distributed throughout so short a distance will not tend to warp the bar out of position. The opposed ends of the long and short levers are connected by a short connecting lever 13 which is of double form to meet the strain of the combined pull of both the long and short levers centered upon it.

The connecting lever comprises an upper and lower bar at one end engaging the top and bottom surface of the free end of the short lever and being pivotally connected thereto by a pivot bolt 14, and at the opposite end being interposed between the upper and lower bar of the long lever and pivotally connected thereto by a pivot bolt 15. The connecting lever 13 is pivotally connected by a pivot bolt 16 to one end of a fulcrum bar 17, the opposite end of which is bifurcated and engages the cross plate 5 and is secured thereto by bolts or rivets 18. By this construction, the short double connecting lever is reinforced by the cross plate 5, the strain of the combined pull of the long and short levers being partly transmitted through the fulcrum bar to this cross plate, which, being firmly secured between the upper and lower bars of the attaching yoke and extension bars will form a reinforcement or brace for the short connecting lever that will enable the latter to withstand any racking strain to which the parts may be subjected during severe conditions of service, as for example, plowing on stony ground.

Secured to the free end of the long lever 10 is a clevis or similar attaching means 19, the outer end of which is provided with an opening 20 to receive a bolt or similar fastening 21, for attachment to a two horse evener, as shown at 22. Secured to the free end of the short lever 9 is a clevis or similar attaching means 23 provided with an opening 24 to receive a bolt 25 for attachment to a three horse evener, as shown at 26.

It will be noticed by reference to Fig. 2 that when this five horse evener is in operative position, one of the horses will walk in the furrow, while the other four horses will walk on the land side or unplowed ground. It will also be noticed that the device, when attached to a gang plow will be in the nature of a single jointed bar which will be held in operative position by the attaching yoke at all times, thereby obviating the disadvantage experienced with the usual form of draft equalizer namely,—that of a multiplicity of levers which drag along the ground between the horses and the plow at the least slack in the pull.

In order to prevent the accidental displacement of the connecting lever a brace bar 27 is positioned below the connecting lever. The brace bar 27 is substantially the same in length as the connecting lever and is provided with openings adjacent its ends for engagement with the extended shanks of the bolts 14 and 15, there being collars or sleeves 28 positioned on the shanks of the bolts above the brace bar to hold the latter spaced from the connecting lever. Stay rods 29 and 30 are secured at one end to the bolts 14 and 15, the other end being suitably secured to the under surface of the short and long lever, respectively, as shown.

From the foregoing description taken in connection with the accompanying drawings it is thought that the construction and operation of my invention will be easily understood without requiring a more extended explanation, it being understood that various changes in the form, proportions and minor details of construction may be made without sacrificing any of the advantages or departing from the spirit of the invention.

What is claimed is:—

1. A draft equalizer having an attaching member provided with terminal extensions, a cross plate between said extensions a short lever fulcrumed on the free end of one of said extensions, a long lever fulcrumed on the free end of the other extension, a connecting lever pivotally connected at one end to one end of said long lever and pivotally connected at the opposite end to the opposed end of said short lever, and a fulcrum bar pivotally connected at its front end to said connecting lever, and secured at its rear end to the cross plate.

2. The combination with a two horse and three horse draft evener, of a draft equalizer having an attaching member provided with openings intermediate the ends to engage the attaching bolts of a plow, spaced extension bars extending forwardly from the terminals of said attaching member, a short lever fulcrumed on one of said extension bars and having terminal means for attachment to said three horse evener, a long lever fulcrumed on the other of said extension bars and having terminal means for attachment to said two horse evener, a connecting lever pivotally connected at its opposite ends to the opposed ends of said long and short levers, a fulcrum bar pivotally connected at one end to said connecting lever and terminating at the other in a bifurcated end, a cross plate connecting the opposed ends of said attaching member and extension bars and engaging the bifurcated end of said fulcrum bar, whereby to brace said extension bars and reinfor said connecting lever.

3. The combination with a two horse and three horse draft evener of a draft equalizer having a securing member comprising a yoke having spaced terminal branches, a cross plate connecting the ends of said branches, spaced extension bars connected at one end to said cross plate adjacent the ends of said terminal branches, a short lever fulcrumed on the free end of one of said extension bars and being terminally adapted for connection to said three horse evener, a long lever fulcrumed on the free end of the other of said extension bars and being terminally adapted for connection to said two horse evener, a connecting lever pivotally attached to the opposed ends of said long and short levers, a fulcrum bar pivotally connected at one end to said connecting lever and at the other engaging said cross plate intermediate the ends of said extension bars, whereby to brace said connecting lever and to positively secure the same to said attaching member.

In testimony that I claim the foregoing as my own, I have hereto affixed my signature in the presence of two witnesses.

DAN SCHEER.

Witnesses:
 H. FRICKE, Jr.,
 CHAS. FEILING.